United States Patent [19]

Canney

[11] 3,978,548

[45] Sept. 7, 1976

[54] END CAP FOR PRIMARY WINDINGS

[75] Inventor: Robert S. Canney, Berwick, Maine

[73] Assignee: General Electric Company, Schenectady, N.Y.

[22] Filed: July 29, 1975

[21] Appl. No.: 600,036

Related U.S. Application Data

[62] Division of Ser. No. 523,255, Nov. 13, 1974, Pat. No. 3,925,744.

[52] U.S. Cl. .............................. 16/109; 174/153 G

[51] Int. Cl.² .......................................... F16L 11/10

[58] Field of Search .......................... 16/108, 109, 2; 174/153 G, 152 G; 336/229, 209

[56] References Cited

UNITED STATES PATENTS

| | | | |
|---|---|---|---|
| 3,372,441 | 3/1968 | Fisher | 174/153 G |
| 3,397,280 | 8/1968 | Klumpp, Jr. | 16/2 X |
| 3,768,115 | 10/1973 | Hoffmann | 16/2 |
| 3,788,655 | 1/1974 | Hathaway | 16/2 X |
| 3,829,184 | 8/1974 | Chevret | 16/2 X |

*Primary Examiner*—Andrew V. Kundrat
*Attorney, Agent, or Firm*—Vale P. Myles

[57] ABSTRACT

End caps for the primary winding of an instrument transformer have a radius to relieve the electrical stress at the sharp edges of the primary. The end caps are provided with recesses to receive the primary leads and also have other recesses for locating the primary in a mold for encapsulating the instrument transformer. Lugs or tongues are provided at the inner edge of the end caps to support the winding during molding. Prior to molding, a conducting tape is attached to one primary lead and wound around the end caps.

4 Claims, 5 Drawing Figures

END CAP FOR PRIMARY WINDINGS

This is a Division of application Ser. No. 523,255, filed Nov. 13, 1974 and now U.S. Pat. No. 3,925,744.

BACKGROUND OF THE INVENTION

This invention relates to instrument transformers, and more particularly, to end caps for the primary winding of instrument transformers.

In many instrument transformers the core and coil members are molded in an electrical insulation material that forms both the insulation of the transformer and the exterior casing thereof. See, for example, U.S. Pat. No. 2,997,526. In these dry-type instrument transformers, often the primary winding if formed of one or more turns of copper or aluminum foil. This type of primary winding has led to two problems. One is the problem of the electrical stresses on the insultion which is caused by the sharp edges of the foil winding. The other is the tendency of the foil winding to collapse or become misshapened during the molding or encapsulation of the core and coil in the electrical insulation material.

It is, therefore, a primary object of this invention to provide a foil wound primary winding with a support means to give mechanical strength to such winding.

It is a further object of this invention to provide support means in the form of end caps for a foil wound primary winding, such end caps being provided with internal and external radii to relieve electrical stresses.

SUMMARY OF THE INVENTION

In carrying out this invention in a preferred form, disk-shaped end caps are provided for foil wound windings. Each end cap has an internal and an external radius which relieves the sharp edges of the foil winding. Conducting tape which electrically engages one primary lead is wound about the exterior surface of the disk-shaped end caps. Each end cap is also provided with a plurality of tongues or lugs which snugly fit into the internal opening or window of the foil winding. As an additional feature of the invention, the end caps are provided with a plurality of recesses for locating the foil winding in a mold by mold pins during the molding operation.

The invention which is sought to be protected will be particularly pointed out and distinctly claimed in the claims appended hereto. However, it is believed that this invention and the manner in which its various objects and advantages are obtained, as well as other objects and advantages thereof, will be better understood by reference to the following detailed description of a preferred embodiment when considered with the accompanying drawing.

DESCRIPTION OF THE PREFERRED EMBODIMENT

Figure 1:
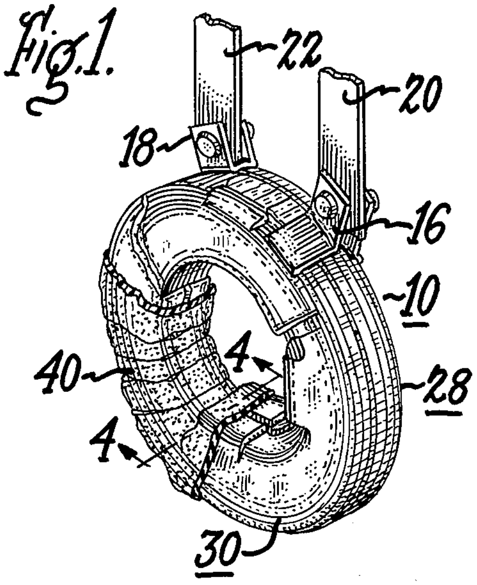
FIG. 1 is a perspective view of a foil winding having the preferred form of end caps of this invention mounted thereon.

Referring now to the drawing, in which like numerals are used to indicate like parts throughout the various views thereof, there is shown in FIG. 1, a composite primary foil winding 10 comprising a plurality of turns of a foil 12 (see FIG. 4) secured by band 14. Leads 16 and 18 are secured to the opposite ends (not shown) of the winding 10; the leads 16, 18 in turn being secured to the transformer leads 20, 22. Obviously, leads 16 and 18 may be secured to winding 10 and leads 20, 22 in any desired manner; such as brazing, bolting and the like, which are well known in the art.

Figure 4:
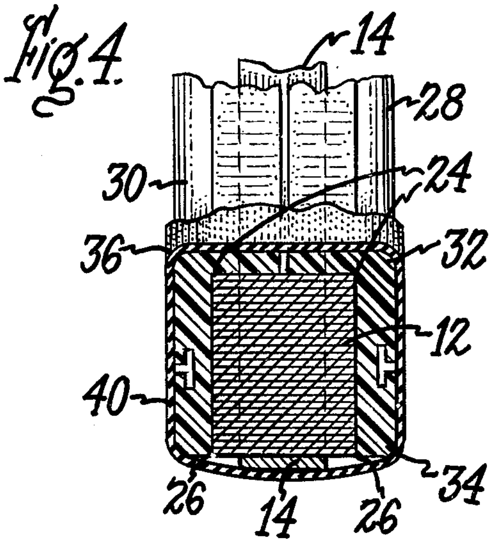
FIG. 4 is a partial sectional view taken on the line 4 — 4 of FIG. 1, on the same scale as FIG. 2.
Figure 5:
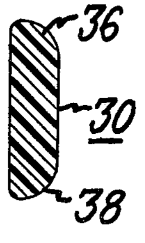
FIG. 5 is a sectional view taken on the line 5 — 5 of FIG. 2.

As is well understood when a winding such as 10 of foil 12 is encapsulated or molded in a dry-type instrument transformer the sharp edges 24 and 26 on the inner and outer diameter of the winding causes an electrical stress on the insulation surrounding the foil winding. To relieve this electrical stress, end caps 28, 30 are placed on opposite sides of the winding of foil 12 and have a radius such as radius 32, 34 on end cap 28 and radius 36, 38 on end cap 30 (see FIG. 5) to eliminate the effect of the sharp edges 24, 26 and eliminate these electrical stresses. Of course, the exterior of the composite winding 10 is wrapped in electrical conducting tape 40, which in turn is electrically connected to either primary winding 16 or 18. In FIGS. 1 and 4, only a few turns of electrical conducting tape 40 are shown so as to improve the overall exposition of the invention.

Figure 2:
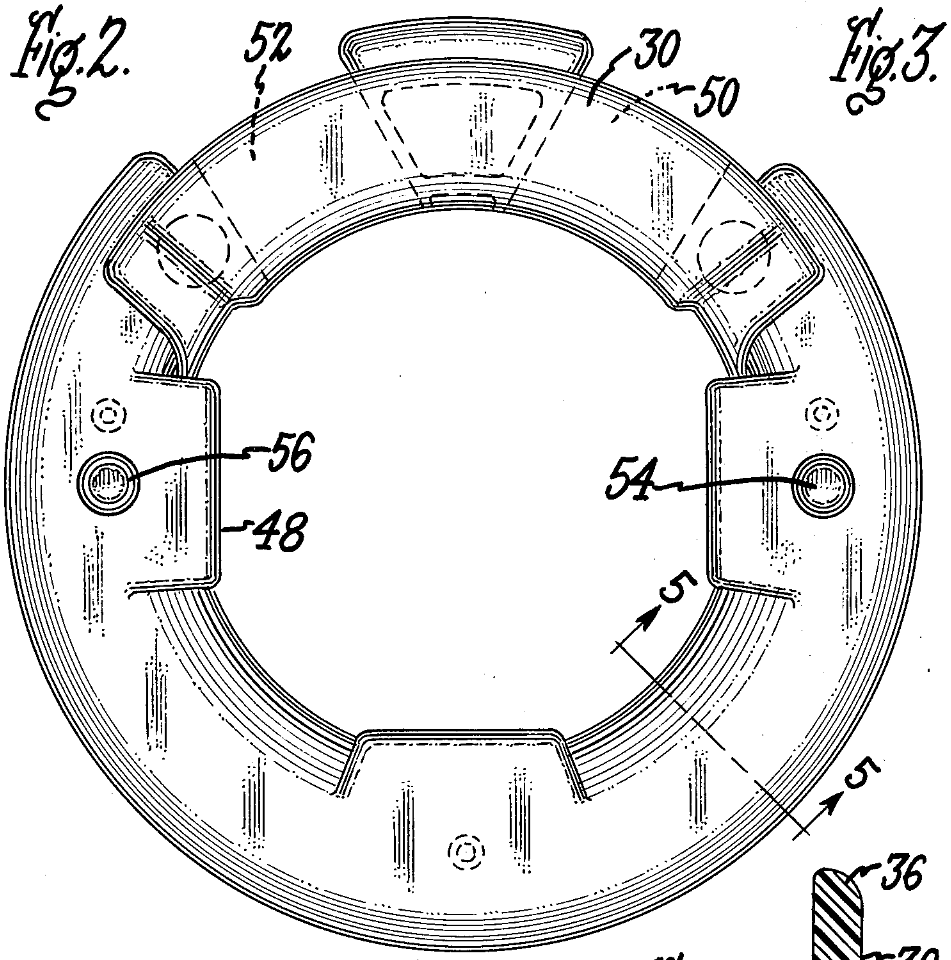
FIG. 2 is a front plan view, on an enlarged scale, of the preferred form of end caps of this invention.
Figure 3:
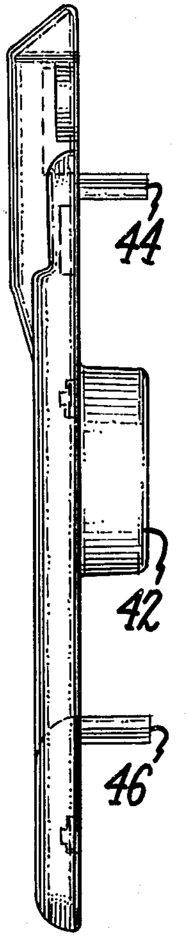
FIG. 3 is a side view of the end caps shown in FIG. 2.

FIGS. 2 and 3 shown respectively the front and side views of a preferred form of the end caps of this invention. It will be understood that while only end cap 30 is shown in FIGS. 2 and 3 that end cap 28 is of the identical shape. Thus, the description of one applies to both. The end caps 28 and 30 are preferably formed of a (polycarbonate resin) material to provide the desired mechanical strength to the primary winding. Obviously, other resinous material of appropriate mechanical strength could be used.

As is shown in FIGS. 2 and 3, molded end cap 30 is provided with a plurality of tongues 42, 44, 46 and 48. These tongues or lugs fit snugly within the interior of the winding of foil 12 as is clearly evident from FIGS. 1 and 4. As will be understood, these tongues support the winding of foil 12, insuring that it will maintain its shape during the molding operation. As can be seen in FIGS. 2 and 4, slots 50 and 52 are provided at the inner surface of end cap 30 to allow the leads 16 and 18 to be brought out from the winding. Further, recesses 54 and 56 are provided on the exterior of end cap 30. These recesses are utilized in conjunction with mold pins to firmly mount the composite primary winding 10 in a mold during the molding or encapsulation of the composite primary winding.

While there has been shown and described the present preferred embodiment of the end caps of this invention and the composite primary winding utilizing such end caps, it will be understood by those skilled in the art that various changes may be made in construction without departing from the spirit and scope of the invention as it is defined in the appended claims.

What is claimed as new and which it is desired to secure by Letters Patent of the United States:

1. An end cap for use with a foil winding to relieve electrical stresses on such foil winding, said end cap comprising;

a disk-shaped member, said disk-shaped member having a central opening therein conforming to the opening of a foil winding, the external and internal surface diameters of said disk-shaped member being provided with radii of curvature for relieving electrical stresses on the sharp edges of a foil winding, four tongues substantially identical in configuration spaced 90 degrees from one another and each having an arcuate width at least four times greater than their radial width, each of said tongues extending from one side of said central opening of the disk-shaped member in a direction substantially perpendicular to one of the generally flat sides of the disk-shaped member and extending beyond said one side a distance substantially equal to the thickest part of said disk-shaped member measured from said one side axially therethrough to its opposite side and a pair of blind recesses on said opposite side of said disk-shaped member.

2. An end cap as defined in claim 1 wherein each of said recesses is in radial alignment with one of said tongues and has a diameter smaller than one-half the arcuate width of the tongue in alignment therewith, the depth of each of said recesses being less than one half the diameter thereof.

3. An end cap as defined in claim 1 including wall means defining a pair of slots (50, 52) in the inner surface of said one side of the disk-shaped member, said slots being at least as wide and deep as said recesses (54, 56) thereby to be effective to enable foil winding leads to be positioned in said slots with the flat sides of said leads below the lips of said slots.

4. An end cap as defined in claim 1 wherein said slots each extend radially from the inner diameter to the outer diameter of said disk-shaped member, both of said slots being disposed within a single quadrant of said disk-shaped member.

* * * * *